United States Patent Office 3,460,948
Patented Aug. 12, 1969

3,460,948
COOKING METHOD AND PRODUCT
Lino Luigi Linteris, Demarest, and John P. McNaught, Saddle River, N.J., assignors to Lever Brothers Company, New York, N.Y., a corporation of Maine
No Drawing. Filed May 27, 1965, Ser. No. 459,462
Int. Cl. A23l *1/00;* A23d *5/00*
U.S. Cl. 99—1                                        5 Claims

ABSTRACT OF THE DISCLOSURE

Glyceride oils of frying food stuff including citrus oils to reduce offensive cooking oders.

---

This invention relates to a method of reducing the offensive cooking odors which normally occur when frying foodstuffs in glyceride oils. The invention also relates to improved cooking oils, which, when used for frying, produce less offensive cooking odors.

Frying is one of the basic methods of preparing foods for human consumption. An edible glyceride cooking oil is generally employed during frying to retard burning and to provide a characteristic flavor to the fried food. One significant problem with this method of preparing foods, however, is the offensive odors of a lasting nature which develop in the room during frying. These odors are particularly offensive in apartment houses, where they accumulate in the hallways and other poorly ventilated areas. The problem is most acute in small, poorly ventilated apartments and where foods such as fish are prepared by frying.

It has now been found that the presence of citrus oils in the cooking oil, preferably at a level ranging from 100 to 1,000 parts per million, significantly reduces the development of unpleasant room odors when the oil is used for frying and the odors which evolve are more pleasant, although not necessarily characteristic of the citrus oil. While the exact mechanism is not understood, it is thought that the reduction of unpleasant cooking odors may be due to the antioxidant effect of aldehydes in the citrus oil, and the effect apparently appears only at the elevated temperatures encountered during frying.

The cooking oil of this invention may be either a salad oil, which is liquid at room temperature, a non-winterized oil such as a refined, bleached and deodorized peanut oil, or plastic shortening, which is plastic or solid at room temperature. The presence of the citrus oil does not make the shortening or salad oil unacceptable for other uses. A salad oil containing the citrus oil has a pleasant odor and is at least equally acceptable in an oil and vinegar dressing for salads.

In the case of the plastic shortenings, the presence of the citrus oil does not adversely affect the use of the shortening; it may be used to advance with cakes, pie crusts and the like with no adverse effects. In those instances where the shortening is heated prior to consumption, most of the citrus oil is dissipated and the flavor of the citrus oil is not discernible in the final product.

The citrus oils used in the compositions of this invention include the natural orange oil, lemon oil and lime oil, as well as the constituted or synthetic citrus oils. The natural oils are retained by expression from the peel of the fruit. Cold-pressed citrus oils are preferred, although citrus oils obtained by any conventional procedure are satisfactory.

As mentioned above, the preferred level of citrus oil in the product of this invention ranges from 100 to 1,000 parts per million, the preferred range being from 500 to 1,000 parts per million. An amount in excess of 1,000 parts per million should not be used unless it is desired to impart a flavor to the product. A level below 100 parts per million provides little benefit. The citrus oil is incorporated in the composition of this invention by simple blending of the citrus oil with the cooking oil.

The following examples are given to illuminate the process and products of this invention.

Example 1

Two batches of plastic shortening, 300 pounds each, and containing 500 and 1,000 parts per million of cold-pressed lemon respectively, were prepared according to the procedure described in U.S. Patent No. 3,095,305. The compositions were textured while plastic household shortenings, composed of, by weight, 88% of a partially hydrogenated soybean and cottonseed oil mixture, 7% of a completely hydrogenated cottonseed oil and 5% of a commercial mono-diglyceride mixture. The compositions had an iodine value of approximately 95 and dilatation values of 20° C. of about 388–422 and at 42° C. of about 140.

Each shortening was then used to fry fish in specially constructed rooms measuring 8′ x 8′ x 8′ and lined with plastic sheeting. A second room was used to conduct the same test with the same shortening which did not contain lemon oil. The fish used for all tests was fillet of flounder, and the frying was done in an electric frying pan set at 325° F.

Fifty women were requested to go into each room after the frying was complete and to state their preference for odors. There was a two to one preference for the odor of the room in which the frying was conducted with the plastic shortening containing 500 parts per million of lemon oil. The same preference was expressed for the shortening containing 1,000 parts per million lemon oil. The rooms were aired between tests to remove any odors remaining from the previous test.

Example 2

The frying test described in Example 1 was conducted using a liquid salad oil comprising a lightly hydrogenated and winterized soybean oil having an iodine value of about 110. The oil is tested alone, and with the addition of 500 parts per million and 1,000 parts per million of lemon oil, respectively. There was again a two to one preference for the odor of the room in which salad oil containing lemon oil at both levels was used.

Of the fifty women participating in the test, only one could detect a difference in flavor between the fish fried in salad oil with lemon oil and the fish fried without lemon oil. Only one of the panelists detected and identified a lemon odor in the room. Apparently the lemon does not provide a covering-up of odors, but actually lessens the effect of the fish odor in the air without imparting the lemon odor.

Example 3

Cold-pressed lemon oil at levels of 100 and 200 parts per million respectively was added to two portions of a bleached, hydrogenated (110 IV), and winterized edible soybean oil. At room temperature, the lemon oil had no effect on the odor of the oil. When the samples were heated, the odor of both lemon containing samples was improved over heated soybean oil alone. At a level of 100 parts per million, it covered up the oiliness demonstrated during frying without the lemon flavor carrying through to the fried food.

Example 4

Various combinations of citrus oils and cooking oils were made and evaluated in accordance with a modified fish frying test. The frying test was conducted along the lines set forth in Example 1 above, using similar equipment. In this instance, cod filet was fried and the evaluation was conducted by three trained observers. None of the cooked fish had a detectable citrus taste.

The soybean salad oil used was a high stability soybean oil produced by slight hydrogenation, followed by winterization and deodorization. The corn oil was a degummed, refined and deodorized oil. The natural soybean oil was refined, bleached and deodorized.

The natural orange, lemon and lime oils were cold-pressed oils from California. The synthetic lemon and lime oils were reconstituted oils from natural and synthetic materials to simulate the analysis of the natural oils.

The following table summarize the compositions and the results of the evaluations:

We claim:
1. A method of frying foods which comprises frying food in an edible glyceride fat containing from about 100 to about 1,000 parts per million of a citrus oil.
2. The method of claim 1, wherein the citrus oil is lemon oil.
3. The method of claim 1, wherein the citrus oil is orange oil.
4. The method of claim 1, wherein the citrus oil is lime oil.
5. The method of claim 1, wherein the citrus oil is present in the glyceride fat at a level of from about 500 to about 1,000 parts per million.

EVALUATION OF GLYCERIDE OILS CONTAINING CITRUS OILS

| No. | Base glyceride oil | Added percent | Citrus oil type | Room odor during fish frying |
| --- | --- | --- | --- | --- |
| 1 | Soybean oil salad oil | | None | Strong fish odor. |
| 2 | do | 0.10 | Orange oil | Sl. reduced fish odor. |
| 3 | do | 0.10 | Lime oil | Strong lime, v. sl. fish odor. |
| 4 | do | 0.10 | Synthetic lemon oil | Mild lemon, reduced fish odor. |
| 5 | do | 0.10 | Synthetic lime oil | Strong lime, v. sl. fish odor. |
| 6 | Corn oil | | None | Sl. acrid and fish odor. |
| 7 | do | 0.10 | Orange oil | Trace orange, mild fish odor. |
| 8 | do | 0.10 | Lemon oil | Sl. lemon, reduced fish odor. |
| 9 | do | 0.05 / 0.05 | Orange oil / Lemon oil | Pleasant, sl. lemon, reduced fish odor. |
| 10 | Natural soybean oil | | None | Normal fish odor. |
| 11 | do | 0.05 | Lemon oil | Sl. lemon, reduced fish odor. |
| 12 | do | 0.10 | do | Sl. lemon, reduced fish odor. |

References Cited

UNITED STATES PATENTS

| 107,244 | 9/1870 | Fox | 99—118 |
| 1,285,555 | 11/1918 | Bradley | 99—140 |
| 1,583,294 | 5/1926 | Kohman et al. | 99—123 |
| 2,165,828 | 7/1939 | Allen | 99—140 |

FOREIGN PATENTS 454,112 1/1950 Italy.

MAURICE W. GREENSTEIN, Primary Examiner

U.S. Cl. X.R.

99—111, 144

PO-1050
(5/69)

UNITED STATES PATENT OFFICE
CERTIFICATE OF CORRECTION

Patent No. 3,460,948      Dated August 12, 1969

Inventor(s) Lino Luigi Linteris and John P. McNaught

It is certified that error appears in the above-identified patent and that said Letters Patent are hereby corrected as shown below:

Column 1, line 13, "of" should be --for--; line 14, "oders" should be --odors--; line 56, "advance" should be --advantage--; line 63, "constituted" should be --reconstituted--;

Column 2, line 3, "composition" should be --compositions--; line 5, "illuminate" should be --illustrate--; line 13, "while" should be --white--; line 42, "is" should be --was--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents